Figures 1, 2:
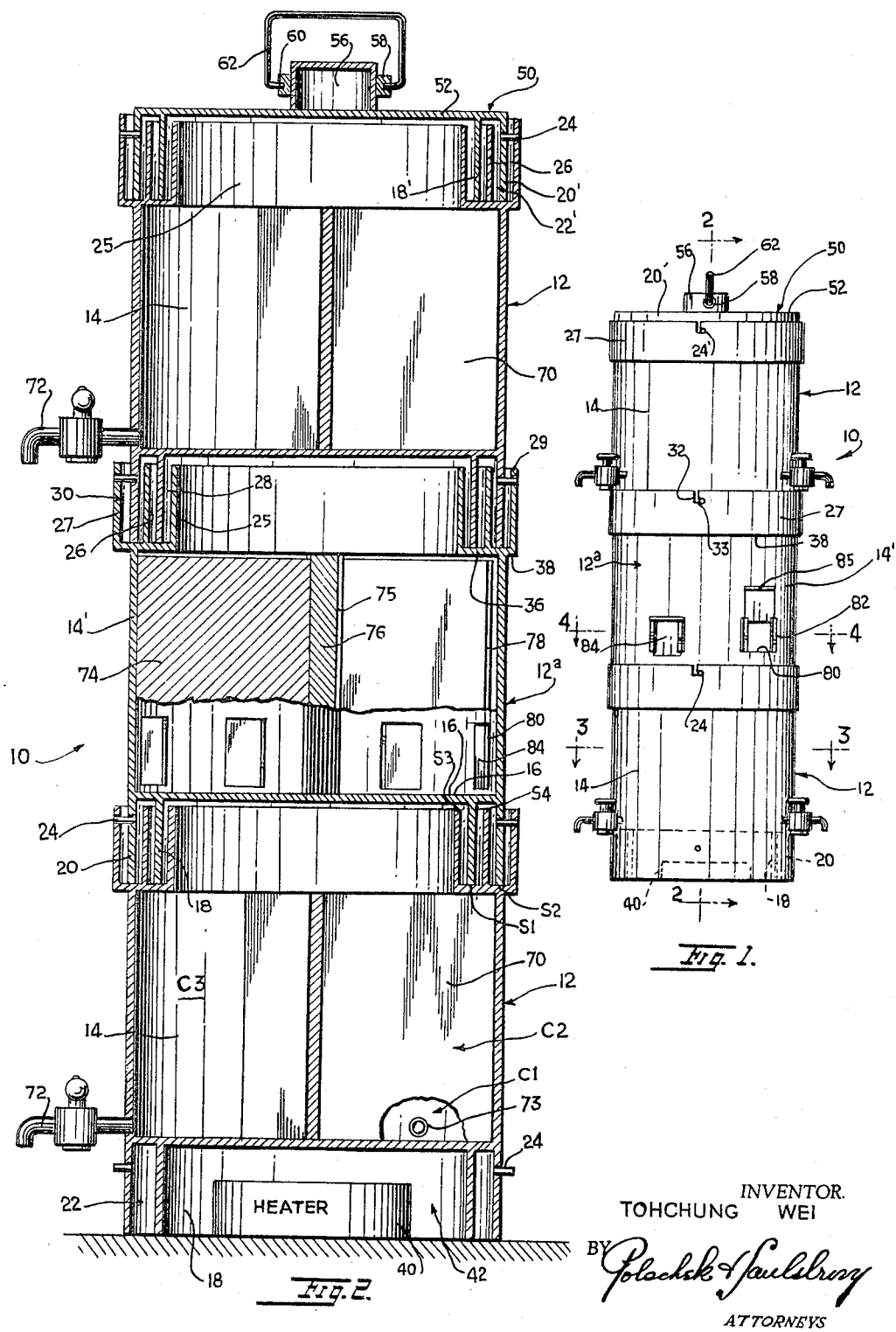

Oct. 25, 1966   TOHCHUNG WEI   3,281,006
COMBINED PARTITIONED FOOD VESSELS
Filed Jan. 6, 1964   2 Sheets-Sheet 1

INVENTOR.
TOHCHUNG WEI
BY Polachek & Saulsbury
ATTORNEYS

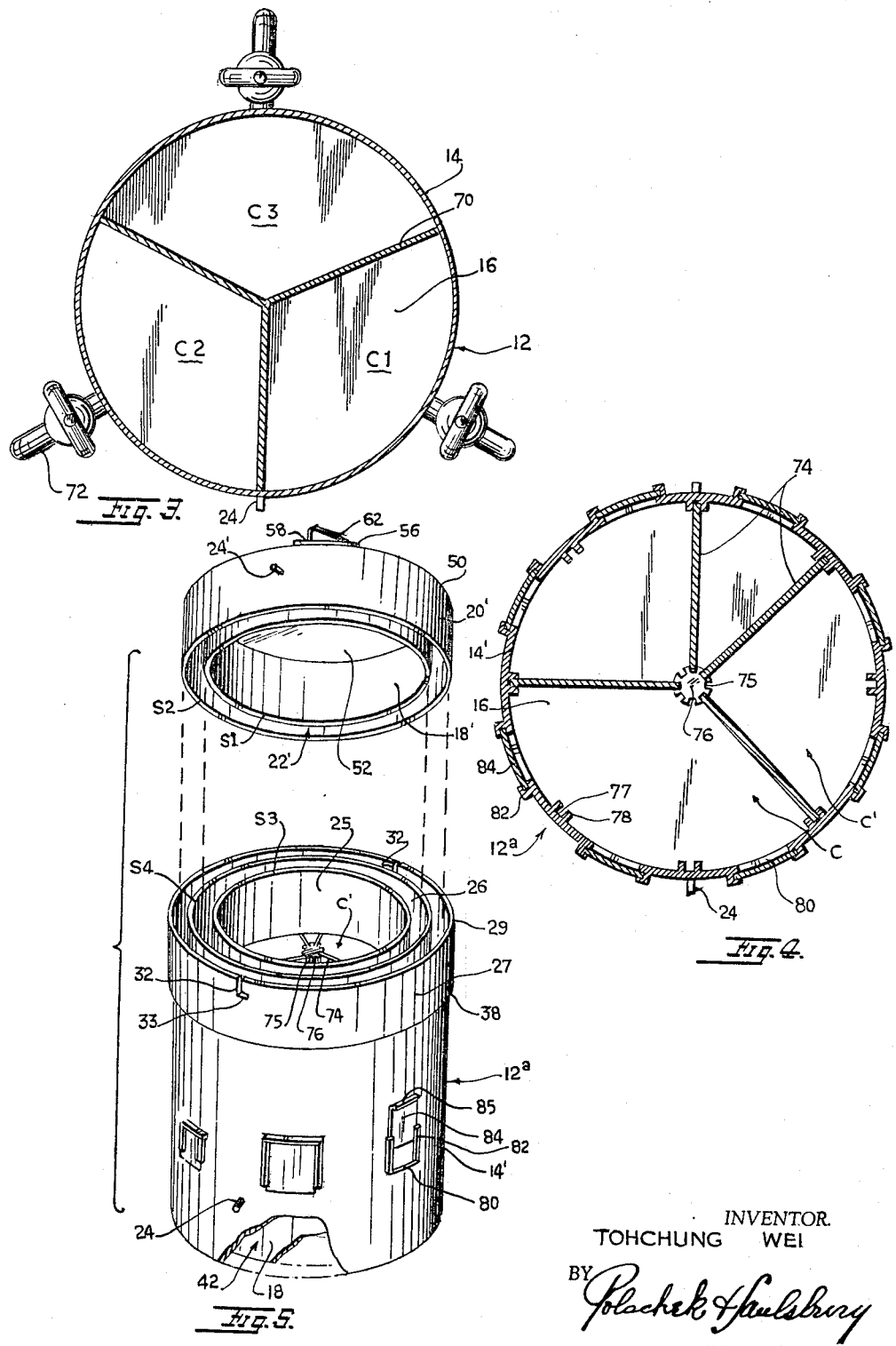

United States Patent Office 3,281,006
Patented Oct. 25, 1966

3,281,006
COMBINED PARTITIONED FOOD VESSELS
Tohchung Wei, 169 E. Broadway, New York, N.Y.
Filed Jan. 6, 1964, Ser. No. 336,006
11 Claims. (Cl. 220—4)

This invention relates to the art of food vessels and more particularly concerns partitioned vessels having means for stacking and sealing a plurality of cylindrical containers. This invention is a continuation-in-part of my application 299,799, filed August 5, 1963.

According to the invention there is provided a cylindrical vessel having a closed bottom and open top. In each vessel are partitions dividing the vessel into a plurality of compartments. The compartments may contain beverages or other liquid foods or may contain solid foods. The partitions may be adjustable in position to enlarge or diminish the sizes of the compartments. An outlet such as a faucet or sliding door is provided for each compartment to discharge the beverage or other food in the compartment. At the top and bottom of the vessel are annular, spaced, concentric flanges. The flanges of one vessel can interfit in sealing relationship with the flanges of another vessel to form an axially aligned stack of vessels. A cover having annular, spaced concentric flanges is provided to close and seal the open top of a vessel.

It is therefore one object of the invention to provide a cylindrical vessel with open top and closed bottom, a plurality of angularly disposed partitions in the vessel dividing the same into a plurality of compartments, and concentric flanges at the top of the vessel to receive interfitting concentric flanges of a sealing cover for the vessel.

Another object is to provide a cylindrical vessel as described, with a valved outlet opening into each compartment for controllable discharging of the contents of each compartment.

A further object is to provide a cylindrical vessel as described wherein the partitions are movable and adjustable to vary the sizes of the compartments.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIGURE 1 is a side elevational view of a vessel or container stack according to the invention.

FIGS. 2, 3 and 4 are sectional views on an enlarged scale, taken on lines 2—2, 3—3 and 4—4, respectively, of FIG. 1.

FIG. 5 is an exploded perspective view of a vessel and cover.

Referring to FIGS. 1–5, there is shown a stack 10 of similar cylindrical cans or containers 12 and 12ª each made of sheet metal. Each of the containers has a cylindrical wall 14 or 14' and transverse, closed circular bottom wall 16. The top of each container is open. At the bottom of each container, extending axially below bottom wall 16, is a pair of concentric flanges 18, 20 defining an annular space 22 therebetween. Flange 20 may be integral with wall 14 or 14' and may be an extension of this wall below bottom wall 16.

A pair of axially aligned bayonet pins 24 extend outwardly of flange 20 at diametrically opposed positions of the flange. These pins are located just below the horizontal plane of bottom wall 16.

At the top of each container are three concentric annular or cylindrical flanges 25, 26, 27 axially aligned with the axis of cylindrical wall 14 or 14' and annular or cylindrical flanges 18, 20. Between flanges 25, 26 is defined an annular space 30 axially aligned with flange 20 and wall 14 or 14'. A pair of L-shaped bayonet slots 32 are formed in flange 27. The slots are located at diametrically opposed positions in the flange. The slots extend axially downward from the top free edge 29 of flange 27 and then circumferentially at 33 from the bottom ends of slots 32. The slot portions 33 are disposed in a horizontal plane parallel to edge 29. Slots 32 receive pins 24 and detachably secure the several cans or containers together in axial alignment.

When the cans or containers are secured together by the bayonet joints 24, 32 the bottom flanges 18, 20 of each upper can or container fits into the spaces 28, 30 defined between upper flanges 25–27 of the next lower can or container, as clearly shown in FIG. 2.

Radial inner annular wall 36 and radial outer annular wall 38 joins the flanges 25–27 to the upper end of wall 14 or 14' of each container. The bottom ends of flanges 18, 20 rest on the upper sides of walls 36, 38. The flanges 25–27 of each container may be extended so that they make contact with the underside of bottom wall 16 of the next higher container in the stack.

It will be apparent that the interior of each container may thus be sealed or closed off from the exterior of each container at not less than two annular sealing surfaces S1, S2 at the bottom end of each container resting on a lower container. Two additional sealing surfaces S3, S4 can be provided at the upper ends of each pair of flanges 25, 26 extending upwardly against the underside of bottom wall 16 of the next higher container.

A suitable heating device 40 can be provided in the circular chamber defined by annular wall 18 of the lowermost container 12 as shown in FIG. 2 for keeping the contents of all containers in a heated condition. When only a single container 12 or 12ª is used alone, the heater 40 can be disposed inside of wall 18 of this single container.

A cover 50 is provided for the open top of container 12 or 12ª. This cover has a flat circular top wall 52 with two depending concentric flanges 18', 20'. Between flanges 18', 20' is defined an annular space 22' which receives intermediate flange 26 of the uppermost container of the stack 10 or of any other container 12 or 12ª, such as shown in FIG. 2 and FIG. 5. Bayonet slots 32 of the uppermost container receive bayonet pins 24 for removably securing the cover to the container.

On the circular top 52 of the cover 50 is centrally located a round hollow knob 56 provided with outwardly extending eyes 58 for engaging bent ends of a looped handle 62. The handle can be used to carry the entire stack of interfitted or nested attached containers or to carry a single container provided with cover 50. Cover 50 closes and seals the container 12 or 12ª along four annular sealing surfaces S1–S4.

In the stack 10 the uppermost and lowermost containers 12 are identical. Each of these containers has partitions 70 extending radially from the central vertical axis of the container to define three compartments C1, C2, C3 as indicated in FIG. 3. The partitions are secured together at the vertical axis of each container, at the inner side of the wall 14 and upper side of wall 16. A plurality of valved outlets or faucets 72 are secured to wall 14 and respectively open at 73 into each compartment near the bottom wall 16. Liquid contents of the compartments can be discharged selectively from the compartments through these faucets.

Container 12ª which is shown in FIGS. 1 and 2 disposed between identical upper and lower containers 12, has partitions 74 slidably interfitted with grooves 75 in core 76 extending axially vertical of the container; see FIG. 4. The partitions extend radially outward of the core and their outer edges are slidably interfitted in grooves 77 defined between pairs of ridges 78 extending vertically on the inner side of wall 14 and integral therewith. The partitions can be relocated in different grooves 75 and 77 to define compartments C, C' of different sizes.

Between each two adjacent pairs of ridges 78 is an opening 80 formed in wall 14'. On the outer side of wall 14' are formed spaced pairs of guide channels 82. These channels are L-shaped in cross section as clearly shown in FIG. 4. A rectangular plate 84 is slidably engaged between each pair of channels to serve as a valved closure or door for the compartment at which the plate is located. At the upper end of each plate 84 is a lip 85 to facilitate manually lifting and lowering the plate to open and close opening 80.

The container 12ª is particularly intended for holding solid foods in the several compartments. The foods should be granular or have such consistencies that they can be poured or discharged through the openings 80. If the contents of any compartment in container 12ª cannot be poured through an opening 80, the container can be opened by disengaging the upper container 12 and lifting it off of container 12ª.

It will be apparent that cover 50 could be placed directly on container 12ª as indicated in FIG. 5. Also the stack 10 may be made up only of partitioned containers 12ª, or with different numbers of containers 12 and 12ª.

It will be noted that cover 50 effects sealing of the open top of a container along four or five concentric sealing surfaces. Also each container in the stack seals the open top of the next lower container along two to four annular, concentric surfaces. This structure insures that the containers are hermetically sealed so that outside air cannot enter and vapors, heat and juices cannot escape from the containers when they are closed. The stacked containers provide a convenient, easily transported and stored assembly.

The cover and containers are preferably made of sheet metal which can be produced by mass production, low cost methods on known types of can-making machinery. The several flanges, ridges and guide channels can be welded to their supports or otherwise integrally formed therewith. The faucets may be welded to the containers or may be screwed into openings formed in the container walls.

The covers and containers can be made of stainless steel, copper, brass or other suitable metals. If desired, they can be made wholly or partly of plastic or other sheet materials.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A sealed, stacked vessel or container assembly, comprising a plurality of cylindrical vessels disposed in an axially aligned stacked array, each of said vessels having a cylindrical wall with a closed circular bottom wall and an open top, a plurality of partitions inside said cylindrical wall, said partitions extending radially and vertically outward of the central vertical axis of the container and terminating at the cylindrical wall and bottom wall to define therewith a plurality of compartments in the vessel, said cylindrical wall having a plurality of outlets therein opening into the respective compartments, valved closures for said outlets at the openings in said cylindrical wall respectively, a first two cylindrical, radially spaced, concentric flanges depending from said bottom wall, three radially spaced concentric other flanges disposed at the open top of each vessel, and a radial annular wall supporting and securing said other flanges to the cylindrical wall of the container, all of said flanges being axially aligned with each other and with the vertical axis of said cylindrical wall, the first two flanges of each upper vessel in said array interfitting in and between the three spaced other flanges at the top of the next lower vessel in said array to define four annular sealing surfaces between said flanges, the bottom wall of the upper vessel and the radial, annular wall of the lower vessel.

2. A sealed, stacked container assembly, comprising a plurality of cylindrical containers disposed in an axially aligned stacked array, each of said containers having a cylindrical wall with a closed circular bottom wall and an open top, a plurality of partitions inside said cylindrical wall, said partitions extending radially and vertically outward of the central vertical axis of the container and terminating at the cylindrical wall and bottom wall to define therewith a plurality of compartments in the container, said cylindrical wall having a plurality of outlets therein opening into the respective compartments, valved closures for said outlets at the openings in said cylindrical wall respectively, a first two cylindrical, radially spaced, concentric flanges depending from said bottom wall, three radially spaced concentric other flanges disposed at the open top of each container, a radial annular wall supporting and securing said other flanges to the cylindrical wall of the container, all of said flanges being axially aligned with each other and with the vertical axis of said cylindrical wall, the first two flanges of each upper container in said array interfitting in and between the three spaced other flanges at the top of the next lower container in said array to define four annular sealing surfaces between said flanges, the bottom wall of the upper container and the radial, annular wall of the lower container, and bayonet joint means on adjacent flanges of stacked containers detachably securing the stacked containers together.

3. A sealed, stacked container assembly, comprising a plurality of cylindrical containers disposed in an axially aligned stacked array, each of said containers having a cylindrical wall with a closed circular bottom wall and an open top, a plurality of partitions inside said cylindrical wall, said partitions extending radially and vertically outward of the central vertical axis of the container and terminating at the cylindrical wall and bottom wall to define therewith a plurality of compartments in the container, said cylindrical wall having a plurality of outlets therein opening into the respective compartments, valved closures for said outlets at the openings in said cylindrical wall respectively, a first two cylindrical, radially spaced, concentric flanges depending from said bottom wall, three radially spaced concentric other flanges disposed at the open top of each container, a radial annular wall supporting and securing said other flanges to the cylindrical wall of the container, all of said flanges being axially aligned with each other and with the vertical axis of said cylindrical wall, the first two flanges of each upper container in said array interfitting in and between the three spaced other flanges at the top of the next lower container in said array to define four annular sealing surfaces between said flanges, the bottom wall of the upper container and the radial, annular wall of the lower container, and bayonet joint means on adjacent flanges of stacked containers detachably securing the stacked containers together, the partitions in at least one of the containers being secured together at the central vertical axis of said one container and being secured to the inner side of said cylindrical wall to the upper side of the bottom wall.

4. A sealed, stacked container assembly, comprising a plurality of cylindrical containers disposed in an axially aligned stacked array, each of said containers having a cylindrical wall with a closed circular bottom wall and an open top, a plurality of partitions inside said cylindrical wall, said partitions extending radially and vertically outward of the central vertical axis of the container and terminating at the cylindrical wall and bottom wall to define therewith a plurality of compartments in the container, said cylindrical wall having a plurality of outlets therein opening into the respective compartments, valved closures for said outlets at the openings in said cylindrical wall respectively, a first two cylindrical, radially spaced, concentric flanges depending from said bottom wall, three radially spaced concentric other flanges disposed at the open top of each container, a radial annular wall supporting and securing said other flanges to the cylindrical wall of the container, all of said flanges being axially aligned with each other and with the vertical axis of said cylindrical wall, the first two flanges of each upper container in said array interfitting in and between the three spaced other flanges at the top of the next lower container in said array to define four annular sealing surfaces between said flanges, the bottom wall of the upper container and the radial, annular wall of the lower container, and bayonet joint means on adjacent flanges of stacked containers detachably securing the stacked containers together, the partitions in at least one of the containers being secured together at the central vertical axis of said one container and being secured to the inner side of said cylindrical wall to the upper side of the bottom wall, the valved closures in said one container being faucets for controllably discharging liquids from the several compartments in said one container.

5. A sealed, stacked container assembly, comprising a plurality of cylindrical containers disposed in an axially aligned stacked array, each of said containers having a cylindrical wall with a closed circular bottom wall and an open top, a plurality of partitions inside said cylindrical wall, said partitions extending radially and vertically outward of the central vertical axis of the container and terminating at the cylindrical wall and bottom wall to define therewith a plurality of compartments in the container, said cylindrical wall having a plurality of outlets therein opening into the respective compartments, valved closures for said outlets at the openings in said cylindrical wall respectively, a first two cylindrical, radially spaced, concentric flanges depending from said bottom wall, three radially spaced concentric other flanges disposed at the open top of each container, a radial annular wall supporting and securing said other flanges to the cylindrical wall of the container, all of said flanges being axially aligned with each other and with the vertical axis of said cylindrical wall, the first two flanges of each upper container in said array interfitting in and between the three spaced other flanges at the top of the next lower container in said array to define four annular sealing surfaces between said flanges, the bottom wall of the upper container and the radial, annular wall of the lower container, and bayonet joint means on adjacent flanges of stacked containers detachably securing the stacked containers together, the partitions in at least one of the containers being secured together at the central vertical axis of said one container and being secured to the inner side of said cylindrical wall to the upper side of the bottom wall, the valved closures in said one container being faucets for controllably discharging liquids from the several compartments in said one container, a cover on the open top of the uppermost container in the stacked array, said cover comprising a circular top wall and two concentric, radially spaced annular flanges depending from said top wall and fitting between said three other radially spaced concentric flanges of the uppermost container to define four other annular sealing surfaces between said top wall and the radial wall of the uppermost container, and a handle on the cover for carrying the entire stacked array of containers.

6. A sealed, stacked container assembly, comprising a plurality of cylindrical containers disposed in an axially aligned stacked array, each of said containers having a cylindrical wall with a closed circular bottom wall and an open top, a plurality of partitions inside said cylindrical wall, said partitions extending radially and vertically outward of the central vertical axis of the container and terminating at the cylindrical wall and bottom wall to define therewith a plurality of compartments in the container, said cylindrical wall having a plurality of outlets therein opening into the respective compartments, valved closures for said outlets at the openings in said cylindrical wall respectively, a first two cylindrical, radially spaced, concentric flanges depending from said bottom wall, three radially spaced concentric other flanges disposed at the open top of each container, a radial annular wall supporting and securing said other flanges to the cylindrical wall of the container, all of said flanges being axially aligned with each other and with the vertical axis of said cylindrical wall, the first two flanges of each upper container in said array interfitting in and between the three spaced other flanges at the top of the next lower container in said array to define four annular sealing surfaces between said flanges, the bottom wall of the upper container and the radial, annular wall of the lower container, and bayonet joint means on adjacent flanges of stacked containers detachably securing the stacked containers together, a generally cylindrical core having a plurality of circumferentially spaced grooves extending radially and longitudinally of the core, said core being disposed in one of the containers at the central vertical axis thereof, a plurality of pairs of ridges on the inner side of the cylindrical wall of said one container defining a groove between each pair of ridges, said partitions being slidably disposed in grooves in the core and grooves between the ridges so that the compartments are adjustable in size.

7. A sealed, stacked container assembly, comprising a plurality of cylindrical containers disposed in an axially aligned stacked array, each of said containers having a cylindrical wall with a closed circular bottom wall and an open top, a plurality of partitions inside said cylindrical wall, said partitions extending radially and vertically outward of the central vertical axis of the container and terminating at the cylindrical wall and bottom wall to define therewith a plurality of compartments in the container, said cylindrical wall having a plurality of outlets therein opening into the respective compartments, valved closures for said outlets at the openings in said cylindrical wall respectively, a first two cylindrical, radially spaced, concentric flanges depending from said bottom wall, three radially spaced concentric other flanges disposed at the open top of each container, a radial annular wall supporting and securing said other flanges to the cylindrical wall of the container, all of said flanges being axially aligned with each other and with the vertical axis of said cylindrical wall, the first two flanges of each upper container in said array interfitting in and between the three spaced other flanges at the top of the next lower container in said array to define four annular sealing surfaces between said flanges, the bottom wall of the upper container and the radial, annular wall of the lower container, and bayonet joint means on adjacent flanges of stacked containers detachably securing the stacked containers together, a generally cylindrical core having a plurality of circumferentially spaced grooves extending radially and longitudinally of the core, said core being disposed in one of the containers at the central vertical axis thereof, a plurality of pairs of ridges on the inner side of the cylindrical wall of said one container defining a groove between each pair of ridges, said partitions being slidably disposed in grooves in the core and grooves between the ridges so that the compartments are adjustable in size, the cylindrical wall of said one container having a plurality of circumferentially spaced openings, guide channels formed on the cylindrical wall of said one container at the openings therein, said valved closures being plates slidably engaged with the guide channels and adjustably closing said openings for controlling discharge of contents of the compartments in said one container.

8. A sealed, stacked container assembly, comprising a plurality of cylindrical containers disposed in an axially aligned stacked array, each of said containers having a cylindrical wall with a closed circular bottom wall and an open top, a plurality of partitions inside said cylindrical wall, said partitions extending radially and vertically outward of the central vertical axis of the container and terminating at the cylindrical wall and bottom wall to define therewith a plurality of compartments in the container, said cylindrical wall having a plurality of outlets therein opening into the respective compartments, valved closures for said outlets at the openings in said cylindrical wall respectively, a first two cylindrical, radially spaced, concentric flanges depending from said bottom wall, three radially spaced concentric other flanges disposed at the open top of each container, a radial annular wall supporting and securing said other flanges to the cylindrical wall of the container, all of said flanges being axially aligned with each other and with the vertical axis of said cylindrical wall, the first two flanges of each upper container in said array interfitting in and between the three spaced other flanges at the top of the next lower container in said array to define four annular sealing surfaces between said flanges, the bottom wall of the upper container and the radial, annular wall of the lower container, and bayonet joint means on adjacent flanges of stacked containers detachably securing the stacked containers together, a generally cylindrical core having a plurality of circumferentially spaced grooves extending radially and longitudinally of the core, said core being disposed in one of the containers at the central vertical axis thereof, a plurality of pairs of ridges on the inner side of the cylindrical wall of said one container defining a groove between each pair of ridges, said partitions being slidably disposed in grooves in the core and grooves between the ridges so that the compartments are adjustable in size, the cylindrical wall of said one container having a plurality of circumferentially spaced openings, guide channels formed on the cylindrical wall of said one container at the openings therein, said valved closures being plates slidably engaged wtih the guide channels and adjustably closing said openings for controlling discharge of contents of the compartments in said one container, a cover on the open top of the uppermost container in the stacked array, said cover comprising a circular top wall and two concentric, radially spaced annular flanges depending from said top wall and fitting between said three other radially spaced concentric flanges of the uppermost container to define four other annular sealing surfaces between said top wall and the radial wall of the uppermost container, and a handle on the cover for carrying the entire stacked array of containers.

9. A sealed, stacked container assembly, comprising a plurality of cylindrical containers disposed in an axially aligned stacked array, each of said containers having a cylindrical wall with a closed circular bottom wall and an open top, a plurality of partitions inside said cylindrical wall, said partitions extending radially and vertically outward of the central vertical axis of the container and terminating at the cylindrical wall and bottom wall to define therewith a plurality of compartments in the container, said cylindrical wall having a plurality of outlets therein opening into the respective compartments, valved closures for said outlets at the openings in said cylindrical wall respectively, a first two cylindrical, radially spaced, concentric flanges depending from said bottom wall, three radially spaced concentric other flanges disposed at the open top of each container, a radial annular wall supporting and securing said other flanges to the cylindrical wall of the container, all of said flanges being axially aligned with each other and with the vertical axis of said cylindrical wall, the first two flanges of each upper container in said array interfitting in and between the three spaced other flanges at the top of the next lower container in said array to define four annular sealing surfaces between said flanges, the bottom wall of the upper container and the radial, annular wall of the lower container, and bayonet joint means on adjacent flanges of stacked containers detachably securing the stacked containers together, the partitions in at least one of the containers being secured together at the central vertical axis of said one container and being secured to the inner side of said cylindrical wall to the upper side of the bottom wall, the valved closures in said one container being faucets for controllably discharging liquids from the several compartments in said one container, a generally cylindrical core having a plurality of circumferentially spaced grooves extending radially and longitudinally of the core, said core being disposed in another one of the containers at the central vertical axis thereof, a plurality of pairs of ridges at the inner side of the cylindrical wall of said other container defining a groove between each pair of ridges, the partitions in said other container being slidably disposed in grooves in the core and grooves between the ridges so that the compartments in said other container are adjustable in size.

10. A sealed, stacked container assembly, comprising a plurality of cylindrical containers disposed in an axially aligned stacked array, each of said containers having a cylindrical wall with a closed circular bottom wall and an open top, a plurality of partitions inside said cylindrical wall, said partitions extending radially and vertically outward of the central vertical axis of the container and terminating at the cylindrical wall and bottom wall to define therewith a plurality of compartments in the container, said cylindrical wall having a plurality of outlets therein opening into the respective compartments, valved closures for said outlets at the openings in said cylindrical wall respectively, a first two cylindrical, radially spaced, concentric flanges depending from said bottom wall, three radially spaced concentric other flanges disposed at the open top of each container, a radial annular wall supporting and securing said other flanges to the cylindrical wall of the container, all of said flanges being axially aligned with each other and with the vertical axis of said cylindrical wall, the first two flanges of each upper container in said array interfitting in and between the three spaced other flanges at the top of the next lower container in said array to define four annular sealing surfaces between said flanges, the bottom wall of the upper container and the radial, annular wall of the lower container, and bayonet joint means on adjacent flanges of stacked containers detachably securing the stacked containers together, the partitions in at least one of the containers being secured together at the central vertical axis of said one container and being secured to the inner side of said cylindrical wall to the upper side of the bottom wall, the valved closures in said one container being faucets for controllably discharging liquids from the several compartments in said one container, a generally cylindrical core having a plurality of circumferentially spaced grooves extending radially and longitudinally of the core, said core being disposed in another one of the containers at the central vertical axis thereof, a plurality of pairs of ridges at the inner side of the cylindrical wall of said other container defining a groove between each pair of ridges, the partitions in said other container being slidably disposed in grooves in the core and grooves between the ridges so that the compartments in said other container are adjustable in size, the cylindrical wall of said other container having a plurality of circumferentially spaced openings, guide channels formed on the cylindrical wall of said other container at the openings therein, the valved closures of said other container being plates slidably engaged with the guide channels and adjustably closing said openings for controlling discharge of contents of the compartments in said other container.

11. A sealed, stacked vessel or container assembly, comprising a plurality of cylindrical vessels disposed in an axially aligned stacked array, each of said vessels having a cylindrical wall with a closed circular bottom wall and an open top, a plurality of partitions inside said cylindrical wall, said partitions extending radially and vertically outward of the central vertical axis of the vessel and terminating at the cylindrical wall and bottom wall to define therewith a plurality of compartments in the vessel, said cylindrical wall having a plurality of outlets therein opening into the respective compartments, valved closures for said outlets at the openings in said cylindrical wall respectively, a first two cylindrical, radially spaced, concentric flanges depending from said bottom wall, three radially spaced concentric other flanges disposed at the open top of each vessel, a radial annular wall supporting and securing said other flanges to the cylindrical wall of the vessel, all of said flanges being aligned with each other and with the vertical axis of said cylindrical wall, the first two flanges of each upper vessel in said array interfitting in and between the three spaced other flanges at the top of the next lower vessel in said array to define four annular sealing surfaces between said flanges, the bottom wall of the upper vessel and the radial, annular wall of the lower vessel, and bayonet joint means on adjacent flanges of stacked vessels detachably securing the stacked vessels together, the partitions in at least one of the vessels being secured together at the central vertical axis of said one vessel and being secured to the inner side of said cylindrical wall to the upper side of the bottom wall, the valved closures in said one container being faucets for controllably discharging liquids from the several compartments in said one vessel, a generally cylindrical core having a plurality of circumferentially spaced grooves extending radially and longitudinally of the core, said core being disposed in another one of the vessels at the central vertical axis thereof, a plurality of pairs of ridges at the inner side of the cylindrical wall of said other vessel defining a groove between each pair of ridges, the partitions in said other vessel being slidably disposed in grooves in the core and grooves between the ridges so that the compartments in said other vessel are adjustable in size, the cylindrical wall of said other vessel having a plurality of circumferentially spaced openings, guide channels formed on the cylindrical wall of said other container at the openings therein, the valved closures of said other vessel being plates slidably engaged with the guide channels and adjustably closing said openings for controlling discharge of contents of the compartments in said other vessel, a cover on the open top of the uppermost vessel in the stacked array, said cover comprising a circular top wall and two concentric, radially spaced annular flanges depending from said top wall and fitting between said three other radially spaced concentric flanges of the uppermost vessel to define four annular sealing surfaces between said top wall and the radial wall of the uppermost vessel, and a handle on the cover for carrying the entire stacked array of vessels.

References Cited by the Examiner

UNITED STATES PATENTS

| | | | |
|---|---|---|---|
| 1,065,633 | 6/1913 | Stone | 220—4 |
| 2,134,865 | 11/1938 | Essery | 222—143 |
| 2,198,459 | 4/1940 | Potts | 220—22 |
| 2,459,940 | 1/1949 | Himmel | 220—22 |
| 3,010,598 | 11/1961 | Foss | 220—4 |
| 3,108,710 | 10/1963 | Lunge | 220—72 X |

THERON E. CONDON, *Primary Examiner*

G. E. LOWRANCE, *Assistant Examiner.*